(12) United States Patent
Hwang et al.

(10) Patent No.: US 10,796,419 B2
(45) Date of Patent: Oct. 6, 2020

(54) ELECTRONIC APPARATUS AND CONTROLLING METHOD OF THEREOF

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Dosik Hwang, Seoul (KR); Kihun Bang, Seoul (KR); Hanbyol Jang, Seoul (KR); Jinseong Jang, Seoul (KR); Min-su Cheon, Seoul (KR); Young-o Park, Seoul (KR); Sun-young Jeon, Anyang-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 212 days.

(21) Appl. No.: 16/002,232

(22) Filed: Jun. 7, 2018

(65) Prior Publication Data

US 2019/0228510 A1    Jul. 25, 2019

(30) Foreign Application Priority Data

Jan. 24, 2018    (KR) .................. 10-2018-0008988

(51) Int. Cl.
| | | |
|---|---|---|
| *G06T 5/00* | (2006.01) | |
| *H04N 9/77* | (2006.01) | |
| *H04N 9/64* | (2006.01) | |

(52) U.S. Cl.
CPC ............. *G06T 5/009* (2013.01); *H04N 9/646* (2013.01); *H04N 9/77* (2013.01);
(Continued)

(58) Field of Classification Search
CPC ............ G06K 9/40; G06T 2207/10024; G06T 2207/20012; G06T 5/001;
(Continued)

(56) References Cited

U.S. PATENT DOCUMENTS

| | | |
|---|---|---|
| 5,426,517 A | 6/1995 | Schwartz |
| 6,879,731 B2 | 4/2005 | Kang et al. |
| (Continued) | | |

FOREIGN PATENT DOCUMENTS

KR    101437898 B1    9/2014

OTHER PUBLICATIONS

Eilertsen et al. "HDR image reconstruction from a single exposure using deep CNNs" ACM Transaction on Graphics vol. 36, No. 6, Article 178, Nov. 2017.*

*Primary Examiner* — Jingge Wu
(74) *Attorney, Agent, or Firm* — Sughrue Mion, PLLC

(57) ABSTRACT

An electronic apparatus includes a memory configured to store a predetermined conversion relation, and a processor configured to obtain first luminance information indicating luminance values of respective pixels included in a first image, and obtain first color information indicating color values of the respective pixels, obtain a first cumulative distribution function indicating a relation between a cumulative pixel count and each luminance level based on the first luminance information, obtain a second cumulative distribution function by applying the predetermined conversion relation to the first cumulative distribution function, calculate second luminance information indicating converted luminance values of the respective pixels by using the first cumulative distribution function and the second cumulative distribution function, and generate a second image based on the first color information and the second luminance information.

17 Claims, 10 Drawing Sheets

(52) U.S. Cl.
CPC ............ *G06T 2207/10024* (2013.01); *G06T 2207/20081* (2013.01); *G06T 2207/20208* (2013.01)

(58) Field of Classification Search
CPC ... G06T 2207/20221; G06T 5/40; G06T 5/50; G06T 2207/20081; G06T 2207/20084; G06T 2207/20208; G06T 5/20; G06T 7/90; H04N 1/4074; H04N 5/2258; H04N 9/646; H04N 9/77
See application file for complete search history.

(56) References Cited

U.S. PATENT DOCUMENTS

| | | | |
|---|---|---|---|
| 8,675,984 B2 | 3/2014 | Jia et al. | |
| 9,460,499 B2 | 10/2016 | McLaughlin et al. | |
| 9,467,704 B2 | 10/2016 | Ten | |
| 2004/0091169 A1* | 5/2004 | Park | G06T 5/009 382/274 |
| 2007/0286480 A1* | 12/2007 | Mizuno | G09G 3/2007 382/168 |
| 2008/0037868 A1* | 2/2008 | Han | G06T 5/009 382/169 |
| 2008/0056567 A1* | 3/2008 | Kwon | G06T 5/009 382/168 |
| 2008/0288417 A1* | 11/2008 | Luessi | G06Q 40/06 705/36 R |
| 2009/0110274 A1* | 4/2009 | Atanassov | G06T 5/009 382/169 |
| 2010/0246940 A1 | 9/2010 | Lin | |
| 2011/0249890 A1* | 10/2011 | Kim | G06T 5/009 382/162 |
| 2011/0268358 A1* | 11/2011 | Ikebe | G06T 5/008 382/172 |
| 2012/0141014 A1* | 6/2012 | Lepikhin | H04N 9/735 382/154 |
| 2012/0201456 A1* | 8/2012 | El-Mahdy | G06T 5/009 382/167 |
| 2013/0107956 A1* | 5/2013 | Muijs | G06T 9/004 375/240.12 |
| 2016/0335751 A1* | 11/2016 | Sidar | H04N 9/646 |
| 2017/0193639 A1 | 7/2017 | Dai et al. | |
| 2018/0007356 A1* | 1/2018 | Kadu | G06T 5/008 |
| 2018/0082454 A1* | 3/2018 | Sahu | G06T 7/90 |
| 2018/0098094 A1* | 4/2018 | Wen | H04N 19/46 |
| 2018/0350047 A1* | 12/2018 | Baar | G06T 5/009 |
| 2018/0374203 A1* | 12/2018 | Xiao | G06T 5/40 |
| 2019/0080440 A1* | 3/2019 | Eriksson | G06T 5/008 |
| 2019/0089956 A1* | 3/2019 | Stessen | H04N 1/6027 |
| 2019/0108447 A1* | 4/2019 | Kounavis | G06N 3/08 |
| 2019/0213439 A1* | 7/2019 | Liu | G06K 9/4652 |
| 2019/0272643 A1* | 9/2019 | Gadgil | G06T 5/009 |

\* cited by examiner

| FIRST IMAGE LUMINANCE VALUE | SECOND IMAGE LUMINANCE VALUE |
|---|---|
| ⋮ | ⋮ |
| 75 | 40 |
| 50 | 20 |
| 25 | 10 |
| ⋮ | ⋮ |

ELECTRONIC APPARATUS AND CONTROLLING METHOD OF THEREOF

CROSS-REFERENCE TO RELATED APPLICATIONS

This application is based on and claims priority under 35 U.S.C. § 119 to Korean Patent Application No. 10-2018-0008988, filed on Jan. 24, 2018, in the Korean Intellectual Property Office, the disclosure of which is incorporated by reference herein in its entirety.

BACKGROUND

1. Field

The disclosure relates to an electronic apparatus and a controlling method thereof, and more particularly, to an electronic apparatus that generates a new image by converting a luminance value of an image and a controlling method thereof.

2. Description of the Related Art

The contrast ratio perceived by the human eye is about 10,000:1, which means the range from the darkest part to the brightest part can be divided into 10,000 steps. The average contrast ratio for a present camera is about 300:1, and the contrast ratio for a new High Dynamic Range (HDR) monitor is about 1,000:1. The smaller the contrast ratio, the wider the portion that is determined to have the same luminance even if the luminance is different, and the image quality deteriorates.

The image quality may be improved by converting an LDR (Low Dynamic Range) image having a low contrast ratio to an HDR image having a high contrast ratio. Conventionally, there is a technique of converting a plurality of LDR images having different luminance into an HDR image having a high contrast ratio and a technique of linearly expanding the luminance of a single LDR image to produce an HDR image.

The technique of converting a plurality of LDR images having different luminance into an HDR image with a high contrast ratio is not made with a single image, and therefore ghost artifact may occur when the plurality of LDR images are combined if a subject is shaken. In addition, there are disadvantages in that it takes time and expense to photograph because a plurality of non-moving images are required.

The technique of linearly expanding the luminance of a single LDR image to produce an HDR image results in noise and distortion.

SUMMARY

An aspect of the embodiments relates to an electronic apparatus that generates a new image by using a new luminance value calculated from a cumulative distribution function according to a luminance value in an LDR image, and a method for controlling the same.

In accordance with an aspect of an embodiment, there is provided an electronic apparatus including a memory; and a processor configured to: control the memory to store a predetermined conversion relation, obtain first luminance information indicating luminance values of respective pixels included in a first image, and obtain first color information indicating color values of the respective pixels; obtain a first cumulative distribution function indicating a relation between a cumulative pixel count and each luminance level among a plurality of luminance levels based on the first luminance information; obtain a second cumulative distribution function by applying the predetermined conversion relation to the first cumulative distribution function; identify second luminance information indicating converted luminance values of the respective pixels by using the first cumulative distribution function and the second cumulative distribution function; and generate a second image based on the first color information and the second luminance information.

A dynamic range of the second image may be wider than a dynamic range of the first image.

The processor may be further configured to obtain the converted luminance values corresponding to the respective pixels based on the luminance values of the respective pixels by using histogram matching between the first cumulative distribution function and the second cumulative distribution function.

The first cumulative distribution function may be obtained by accumulating a number of pixels having a luminance value less than or equal to a first luminance value and identifying a first cumulative pixel count corresponding to the first luminance value, and by accumulating a number of pixels having a luminance value less than or equal to a second luminance value greater than the first luminance value and identifying a second cumulative pixel count corresponding to the second luminance value.

The processor may be further configured to identify a cumulative pixel count corresponding to a specific luminance value in the first cumulative distribution function, identify a luminance value corresponding to a cumulative pixel count same as the identified cumulative pixel count in the second cumulative distribution function, and obtain the identified luminance value as a converted luminance value of a pixel having the specific luminance value.

The predetermined conversion relation may be a relation obtained by training a process of converting a Low Dynamic Range (LDR) training image into a High Dynamic Range (HDR) training image through deep-learning.

The first and second images may be RGB domain images, and the processor may be further configured to generate the second image by obtaining the first luminance information and the first color information by converting the first image into a Lab domain image, and converting a Lab domain image based on the first color information and the second luminance information into an RGB domain image.

The processor may be further configured to identify each of the first image and the second image by a plurality of pixel areas, generate a first frame by alternately arranging a pixel area of the first image and a pixel area of the second image, and generate a second frame by arranging the pixel area of the second image on the pixel area of the first image and the pixel area of the first image on the pixel area of the second image.

The electronic apparatus may further include a display, wherein the processor is further configured to control the display to alternately display the first frame and the second frame.

In accordance with an aspect of the disclosure, there is provided a method for controlling method for an electronic apparatus that stores a predetermined conversion relation, the method may include obtaining first luminance information indicating luminance values of respective pixels included in a first image, and obtaining first color information indicating color values of the respective pixels, obtaining a first cumulative distribution function indicating a relation between a cumulative pixel count and each luminance level among a plurality of luminance levels based on the first luminance information, obtaining a second cumulative distribution function by applying the predetermined conversion relation to the first cumulative distribution function, identifying second luminance information indicating converted luminance values of the respective pixels by using the first cumulative distribution function and the second cumulative distribution function, and generating a second image based on the first color information and the second luminance information.

A dynamic range of the second image may be wider than a dynamic range of the first image.

The identifying of the second luminance information may include obtaining the converted luminance values corresponding to the respective pixels based on the luminance values of the respective pixels by using histogram matching between the first cumulative distribution function and the second cumulative distribution function.

The first cumulative distribution function may be obtained by accumulating a number of pixels having a luminance value less than or equal to a first luminance value and identifying a first cumulative pixel count corresponding to the first luminance value, and by accumulating a number of pixels having a luminance value less than or equal to a second luminance value greater than the first luminance value and identifying a second cumulative pixel count corresponding to the second luminance value.

The identifying of the second luminance information may include identifying a cumulative pixel count corresponding to a specific luminance value in the first cumulative distribution function, identifying a luminance value corresponding to a cumulative pixel count same as the identified cumulative pixel count in the second cumulative distribution function, and obtaining the identified luminance value as a converted luminance value of a pixel having the specific luminance value.

The predetermined conversion relation may be a relation obtained by training a process of converting a Low Dynamic Range (LDR) training image into a High Dynamic Range (HDR) training image through deep-learning.

The first and second images may be RGB domain images, and the generating of the second image may include obtaining the first luminance information and the first color information by converting the first image into a Lab domain image, and converting a Lab domain image based on the first color information and the second luminance information into an RGB domain image.

The method may further include identifying each of the first image and the second image by a plurality of pixel areas, and generating a first frame by alternately arranging a pixel area of the first image and a pixel area of the second image, and generating a second frame by arranging the pixel area of the second image on the pixel area of the first image and the pixel area of the first image on the pixel area of the second image in the first frame.

The method may further include displaying the first frame and the second frame alternately.

In accordance with an aspect of the disclosure, there is provided a non-transitory computer readable medium that stores one or more instructions, that when executed, cause an electronic apparatus to perform obtaining first luminance information indicating luminance values of respective pixels included in a first image and first color information indicating color values of the respective pixels, obtaining a first cumulative distribution function indicating a relation between a cumulative pixel count and each luminance level based on the first luminance information, obtaining a second cumulative distribution function by applying a predetermined conversion relation to the first cumulative distribution function, identifying second luminance information indicating converted luminance values of the respective pixels by using the first cumulative distribution function and the second cumulative distribution function, and generating a second image based on the first color information and the second luminance information.

According to the above-described various embodiments, a channel list for broadcast programs which are expected to be viewed by a user at a time when a predetermined event occurs in the display apparatus is provided and thus, the user may be provided with a more effective channel list.

DETAILED DESCRIPTION

Figure 1:
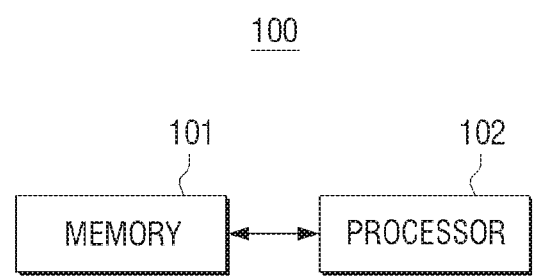
FIG. 1 is a block diagram provided to explain an electronic apparatus according to an embodiment.

Before describing the disclosure in detail, a method of describing the present specification and drawings will be described.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In addition, the same reference numerals as used in the accompanying drawings denote parts or components performing substantially the same function. For ease of explanation and understanding, different embodiments will be described using the same reference numerals. In other words, even though all the elements having the same reference numerals are shown in the plural drawings, the plural drawings do not mean one embodiment.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

The disclosure is not limited to an embodiment disclosed below and may be implemented in various forms and the scope is not limited to the following embodiments. In addition, all changes or modifications derived from the meaning and scope of the claims and their equivalents should be construed as being included within the scope of the disclosure. In the following description, the configuration which is publicly known but irrelevant to the gist of the disclosure could be omitted.

The term such as "first" and "second" used in various embodiments may use various elements regardless of an order and/or importance of the corresponding elements, and does not limit the corresponding elements. The terms are used simply to distinguish one element from other elements.

The terms used in the application are merely used to describe embodiments, and are not intended to limit the scope of the disclosure. Singular forms are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 is a block diagram provided to explain an electronic apparatus according to an embodiment.

Referring to FIG. 1, an electronic apparatus 100 according to an embodiment may consist of a memory 101 and a processor 102.

The electronic apparatus 100 may be an electronic apparatus that performs a photographing operation such as a camera, a smart phone, a tablet, etc. However, the disclosure is not limited thereto, but an electronic apparatus may vary as long as it is capable of receiving and converting an image.

The memory 101 may be embodied with a nonvolatile memory, a volatile memory, a flash memory, a hard disk drive (HDD), or a solid state drive (SSD). The memory may be embodied as an external storage medium such as a micro SD card, a USB memory or a web server via a network as well as a storage medium in an electronic apparatus.

The memory may store a predetermined conversion relation. The predetermined conversion relation may be a relation for converting an LDR image into a HDR image. To be specific, a relation may be obtained by comparing the conventional LDR image with a HDR image generated by conventional technology. The detailed description will be made below with reference to FIG. 4.

The processor 102 may perform overall control operations of the electronic apparatus 100. To be specific, the processor 102 may control to obtain specific information from an LDR image and convert a part of the specific information.

The specific information may be luminance information and color information and the processor 102 may obtain first luminance information indicating luminance values of respective pixels included in a first image and first color information indicating color values of the respective pixels. The first image may be an LDR image.

The processor 102 may obtain a first cumulative distribution function indicating a relation between a cumulative pixel count and each luminance level based on the first luminance information included in the first image. A cumulative distribution function may be a function indicating distribution of the cumulative pixel count according to the degree of brightness, and as a luminance value increases, the cumulative pixel count increases.

For example, the first cumulative distribution function may be defined by accumulating the number of pixels having a luminance value equal to or smaller than a first luminance value and setting a first cumulative pixel count corresponding to the first luminance value, and by accumulating the number of pixels having a luminance value equal to or smaller than a second luminance value greater than the first luminance value and setting a second cumulative pixel count to correspond to the second luminance value. In other words, a cumulative pixel count may be increasingly increased in a cumulative distribution function. The detailed description of the cumulative distribution function will be made below with reference to FIG. 3.

The processor 102 may obtain a second cumulative distribution function by applying a predetermined conversion relation to the first cumulative distribution function. The predetermined conversion relation may be a relation obtained by training a process of converting an LDR training image into a HDR training image through deep-learning. For example, the processor 102 may set an LDR image and a HDR image generated by a conventional technique as training images. In this case, a plurality of LDR images and a plurality of HDR images may be used. The HDR image generated by a conventional technique may be an image having a high contrast ratio without distortion or ghost artifact.

The processor 102 may analyze a training image set corresponding to the LDR image and the HDR image and obtain a least-error relation through deep-learning. In this case, a conventional neural network method may be used as a deep-learning method.

The predetermined conversion relation may be pre-stored in the memory 101, and the processor 102 may collectively apply the predetermined conversion relation to the first cumulative distribution function of the LDR image. The detailed description will be made below with reference to FIG. 4.

The processor 102 may obtain the second cumulative distribution function obtained by applying the predetermined conversion relation to the first cumulative distribution function. The second cumulative distribution function may be obtained by the predetermined conversion relation, and the second cumulative distribution function may correspond to a cumulative distribution function of the HDR image.

The processor 102 may calculate second luminance information by using the first cumulative distribution function and the second cumulative distribution function generated from the first cumulative distribution function. The second luminance information may refer to converted luminance values of respective pixels.

The processor 102 may use histogram matching between the first cumulative distribution function and the second cumulative distribution function and obtain a converted luminance value corresponding to each pixel based on the luminance value of each pixel.

The processor 102 may identify a cumulative pixel count corresponding to a specific luminance value in the first cumulative distribution function, identify a luminance value corresponding to the cumulative pixel count same as the identified cumulative pixel count in the second cumulative distribution function and obtain the identified luminance value as a converted luminance value of a pixel having a specific luminance value.

The processor 102 may convert a luminance value of the first image (the LDR image) by using the histogram matching. The processor 102 may obtain the converted luminance values with respect to all luminance levels, and generate a second image based on the first color information and the second luminance information.

The first and second images may be RGB domain images, and the processor 102 may generate a second image by obtaining the first luminance information and the first color information by converting the first image into a Lab domain image and by converting the Lab domain image based on the first color information and the second luminance information into an RGB domain image. The Lab domain may be a domain including both luminance information and color information.

The processor 102 may generate a new Lab domain image based on the first color information and the second luminance information, and convert the newly generated Lab domain image into a RGB domain image. In this case, the RGB domain image may be presented by the second image and output on the display as a HDR image.

In this case, a dynamic range of the second image may be wider than a dynamic range of the first image. The contrast ratio of the second image (a HDR image) may be higher than that of the first image (an LDR image), and the dynamic range of the second image (a HDR image) may be wider than that of the first image (an LDR image). Therefore, the second image converted from the first image may be a HDR image and the second image may have a higher contrast ratio and a wider dynamic range than the first image.

As a result, the second image may have more levels of contras ratio than the first image, and therefore the subject may be more clearly distinguished by the second image.

The processor 102 may generate a frame of the same size as the first image and the second image. The frame may have the first image and the second on a grid pattern. For example, a part of the first image may be included in a first area of the frame, and a part of the second image may be included in a second area adjacent to the first area. In other words, a single frame may include both the part of the first image and the part of the second image, and when viewed from a distance, the frame may appear to be a single complete image.

The shape and content of the whole image may be maintained in spite of different luminance values in some areas since a frame should include both the first image and the second image and also represent a complete image.

The processor 102 may identify each of the first image and the second image by a plurality of pixels, generate a first frame by alternately arranging the pixel area of the first image and the pixel area of the second image, and generate a second frame by arranging the pixel area of the second image on the pixel area of the first image and the pixel area of the first image on the pixel area of the second image in the first frame.

The electronic apparatus 100 may further include a display, and the processor 102 may control a display to alternately display the first frame and the second frame.

The processor 102 may set the first frame and the second frame to be displayed alternately in a short time.

The first image may be an LDR image and the second image may be a HDR image. The second image having a higher contrast ratio may be generated by converting the first image. However, in this case, the first image and the second image may be displayed in one frame by separating an image into specific areas to minimize the difference from original and increase a contrast ratio at the same time. The detailed description will be made in reference to FIG. 9.

The electronic apparatus 100 may be convert an LDR image having a low contrast ratio to a HDR image having a high contrast ratio, thereby providing a user with a HDR image in an easy and simply way.

A HDR image that is obtained by combining a plurality of images by a conventional technique may be available from a single LDR image. Therefore, time and cost required for acquiring a plurality of pieces of images may be reduced and the ghost artifact that occurs due to the moving subject may be prevented.

Figure 2:
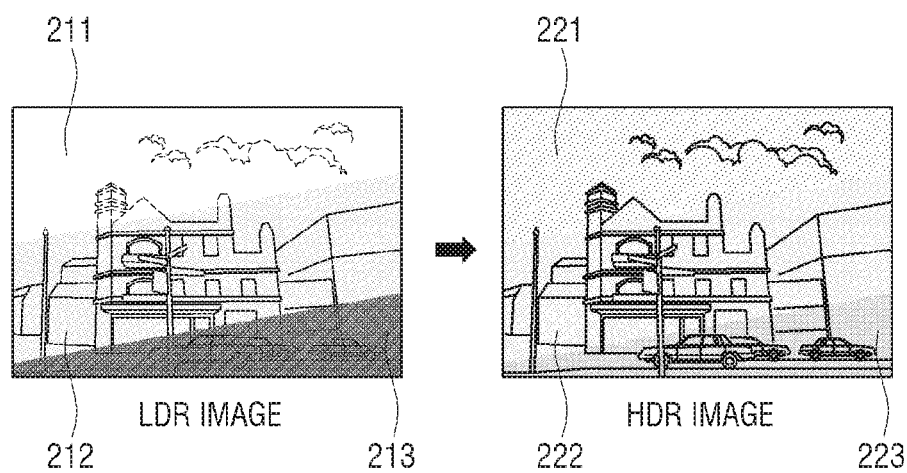
FIG. 2 is a view provided to compare an LDR image with a HDR image, according to an embodiment.

FIG. 2 is a view provided to compare an LDR image with a HDR image.

Referring to FIG. 2, the LDR image may include a bright area 211, a general area 212, and a dark area 213. Since the contrast ratio of the LDR image is low, it is difficult to perceive luminance in a bright area or a dark area, and the brightness of the object may be reduced. The subject may be easily perceived in the general area 212, but it could be difficult to perceive the subject in the bright area 211 or the dark area 213.

However, in the HDR image, the subject may be more easily perceived than in the LDR image. For example, the HDR image may include a bright area 221, a general area 222 and a dark area 223. Compared to the LDR image, the subject may be easily perceived both in the bright area 221 and the dark area 223. Since the contrast ratio of HDR image is higher than that of the LDR image, the HDR image may have various luminance levels, and therefore the subject may be easily perceived.

Conventionally, a HDR image may be obtained by synthesizing the plurality of pictures having different exposure values. However, if the pictures are shaken, the subject may not be clearly output or may be distorted.

To solve the problem, the electronic apparatus 100 may obtain a HDR image by using a single LDR image, not combining a plurality of pictures.

Figure 3:
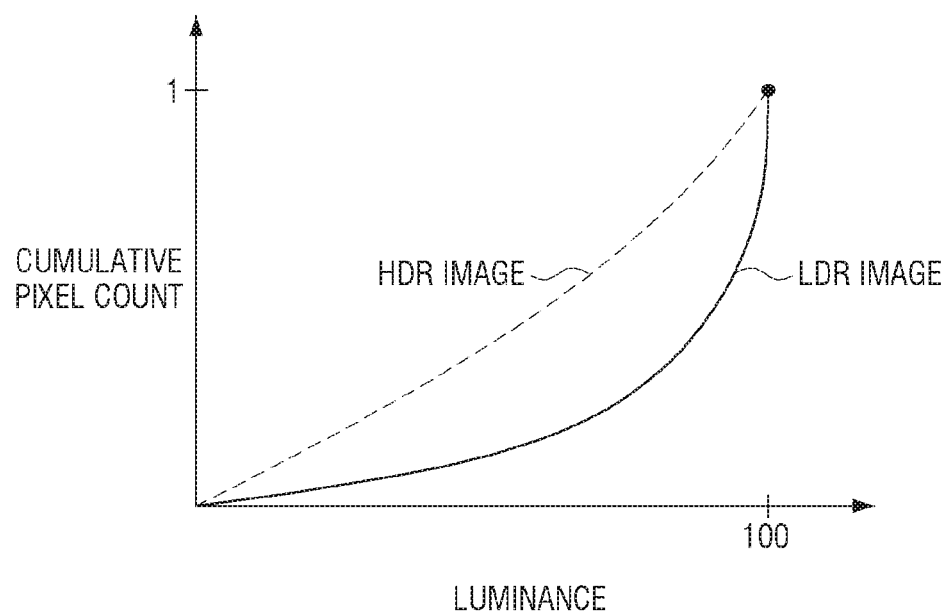
FIG. 3 is a view showing a cumulative distribution function for comparing an LDR image with a HDR image, according to an embodiment.

FIG. 3 is a cumulative distribution function for comparing an LDR image with a HDR image.

Referring to FIG. 3, cumulative distribution functions may be presented for comparing a LDR image with a HDR image. In this case, a cumulative distribution function may indicate distribution of a cumulative pixel count based on a brightness value. A gradient of a cumulative distribution function shown in FIG. 3 may indicate the number of pixels having a corresponding brightness value. For example, a cumulative pixel count having a bright value of 80 may correspond to 0.25 of an LDR image and 0.6 of a HDR image. The cumulative pixel count 0.25 of a pixel having a brightness value of 80 in the LDR image may mean that the number of pixels having a bright value equal to and greater than 80 is 0.75.

The cumulative distribution function may normalize both the brightness value and the cumulative pixel count. For example, all images may be normalized to have a brightness value between 1 and 100. In this case, images having different brightness value ranges may have a brightness value of only 1 to 100.

Likewise, the cumulative pixel count may be normalized. For example, all images may be normalized so that the cumulative pixel count may have a value from 0 to 1. In this case, the cumulative pixel count corresponding to the brightness value 100 at which all the pixels of the image are accumulated may be 1. In this case, images having different numbers of pixels may have only a value between 0 and 1.

The number of pixels of the brightness value may be determined by the gradient of the cumulative distribution function of FIG. 3. The degree of the gradient of the cumulative distribution function may mean the number of pixels having the corresponding brightness value. For example, the large gradient of the cumulative distribution function may mean that there are many pixels having the brightness value. Conversely, the small gradient of the cumulative distribution function may mean that there are less pixels having the brightness value.

Referring to the cumulative distribution functions of the LDR image and the HDR image of FIG. 3, it is identified that a gradient of the cumulative distribution function may be large at the greater brightness level, and the cumulative distribution function of FIG. 3 may be considered to present a bright image over on the whole.

Since the dynamic range of the LDR image is narrower than that of the HDR image, distortion may occur in dark or bright areas. Therefore, the LDR image may have a larger number of pixels having the brightest or darkest color values than the HDR image. In the cumulative distribution function of FIG. 3, it may be determined that the distortion is more serious in that the function of the LDR image is shifted to the lower right side than the function of the HDR image.

Figure 4:
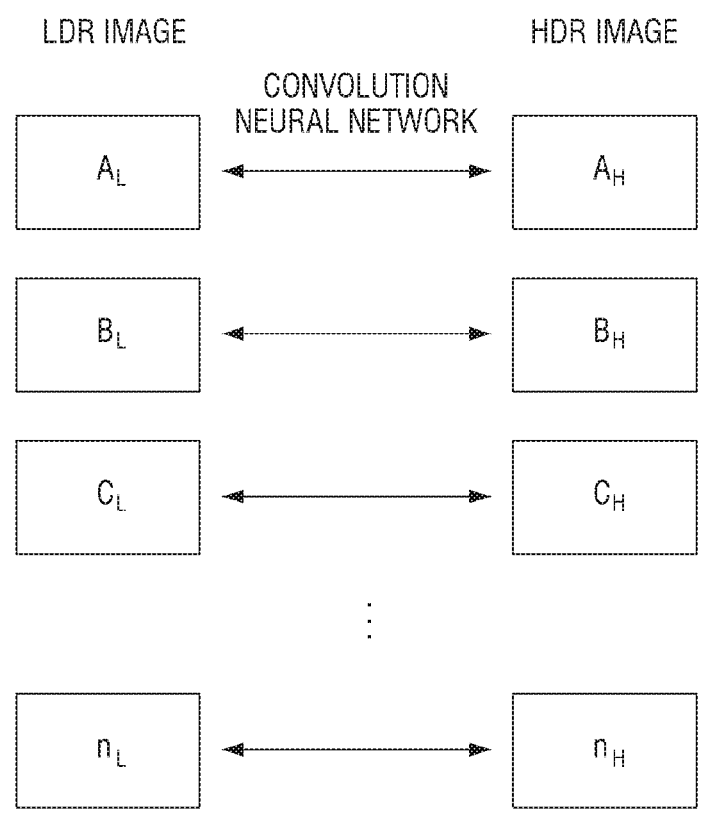
FIG. 4 is a view provided to explain a process for obtaining a relation applied to an LDR image, according to an embodiment.

FIG. 4 is a view provided to explain a process of obtaining a conversion relation to be applied to an LDR image.

Referring to FIG. 4, the electronic apparatus 100 may perform a deep-learning operation for obtaining a conversion relation. Specifically, a convolution neural network method may be used for obtaining a conversion relation between an LDR image and a HDR image. The electronic apparatus 100 may compare a cumulative distribution function of an LDR image with a cumulative distribution function of a HDR image. The HDR image may be an image generated by conventional technology, and an image having a higher contrast ratio. In addition, the HDR image may easily perceive a subject having a higher contrast ratio than the LDR image. The electronic apparatus 100 may compare the LDR image with the HDR image having a higher contrast ratio through a cumulative distribution function.

The electronic apparatus 100 may obtain a relation between a cumulative distribution function of an LDR image and a cumulative distribution function of a HDR image. The electronic apparatus 100 may present an LDR image($A_L$) and a HDR image($A_H$) to the same subject as a single image set. The electronic apparatus 100 may analyze a plurality of image sets and search for a relation for converting a cumulative distribution function of LDR images($A_L$, $B_L$, $C_L$, ... and $n_L$) into a cumulative distribution function of HDR images($A_H$, $B_H$, $C_H$, ... and $n_H$) by using a deep-learning based machine training algorithm.

According to the disclosure, a conversion relation may be obtained by a machine learning-based recognition system, and a deep learning-based recognition system may be exemplified as a distribution system by a series of machine training algorithms based on neural networks.

The deep-learning based recognition system may include at least one classifier. The classifier may be one or more of processors. The processor may be embodied with an array of a plurality of logic gates, and embodied with the combination of a general purpose microprocessor and a memory that stores a program executed by this microprocessor.

The classifier may be embodied as a neural network based classifier, a support vector machine (SVM), an Adaboost classifier, a Bayesian classifier, and a Perceptron classifier. Hereinafter, the classifier of the disclosure will be described with respect to an embodiment implemented with a Convolutional Neural Network (CNN) based classifier. A neural network-based classifier may be a computational model designed to mimic the computational capability of a biological system using a large number of artificial neurons connected via connection lines. However, the disclosure is not limited thereto, and may be embodied as various classifiers described above.

A typical neural network may include an input layer, a hidden layer, and an output layer, and the hidden layer may be provided with one or more layers as needed. As an algorithm for training the neural network, a Bak Propagation algorithm may be used.

A classifier may, based on data being input to the input layer of the neural network, train the neural network so that output data regarding the input training data may be output to the output layer of the neural network. Based on specific information obtained from the captured image being input, the classifier may classify patterns of specific information into any one of the classes by using the neural network and output the result of classification.

The processor 102 may use a deep-learning based recognition system as a classification system by a series of machine training algorithms based on the neural networks.

The electronic apparatus 100 may input information regarding the LDR image into the input layer and set the information regarding the HDR image to the output layer. The electronic apparatus 100 may search for a relation by comparing information set to the input layer and the output layer. The electronic apparatus 100 may search for a relation between the cumulative distribution function of the LDR image and the cumulative distribution function of the HDR image. The electronic apparatus 100 may perform a selftraining operation until a relation having a smallest difference between the cumulative distribution function of the LDR image and the cumulative distribution function of the HDR image is acquired.

The electronic apparatus 100 may acquire a conversion relation by using deep-learning based recognition system based on a machine training algorithm.

Figure 5:
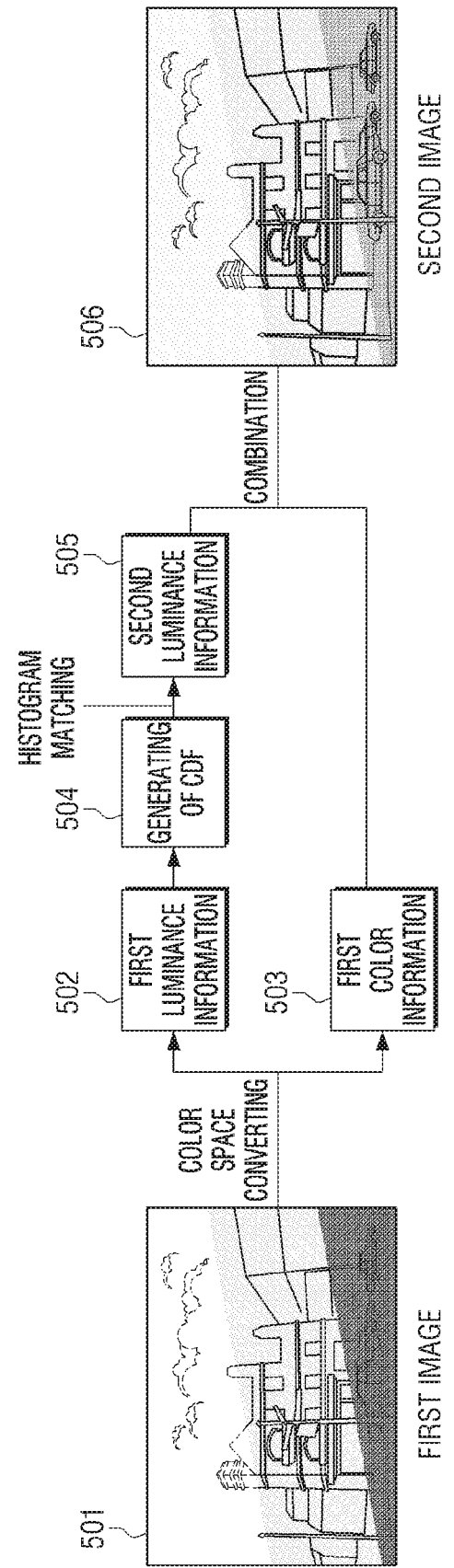
FIG. 5 is a view provided to explain a process of converting an LDR image, according to an embodiment.

FIG. 5 is a view provided to explain a process of converting an LDR image.

Referring to FIG. 5, the electronic apparatus 100 may convert a first image 501 into a second image 506. The first image may be an LDR image and the second image may be a HDR image. The first and second images may be RGB domain images.

The electronic apparatus 100 may change the first image from RGB domain to Lab domain through color space converting or color space conversion. The Lab image converted from the RGB domain may be represented by L value indicating luminance and a value and b value indicating a color value.

The electronic apparatus 100 may change the L value, a luminance value, in the Lab domain. To be specific, the electronic apparatus 100 may calculate a cumulative distribution function by a luminance value included in the first image. The electronic apparatus 100 may calculate a first cumulative distribution function with respect to the first image.

The electronic apparatus 100 may obtain a second cumulative distribution function converted by applying a predetermined conversion relation to a first cumulative distribution function. The second cumulative distribution function may be obtained by the predetermined conversion relation, and the second cumulative distribution function may be a cumulative distribution function of the HDR image.

The processor 102 may calculate second luminance information by using the first cumulative distribution function (CDF) and the second cumulative distribution function generated from the CDF (504). The second luminance information may refer to converted luminance values of respective pixels.

The processor 102 may obtain converted luminance values corresponding to respective pixels based on luminance values of respective pixels by using histogram matching between the first cumulative distribution function and the second cumulative distribution function.

For example, the processor 102 may identify a cumulative pixel count corresponding to a specific luminance value in the first cumulative distribution function, identify a luminance value corresponding to a cumulative pixel count same as the identified cumulative pixel count in the second cumulative distribution function and obtain the identified luminance value as a converted luminance value of a pixel having the specific luminance value.

The processor 102 may convert a luminance value of the first image (an LDR image) by using histogram matching. The processor 102 may obtain converted luminance values with respect to all luminance levels, and the processor 102 may generate a second image 506 by combining the first color information 503 with the second luminance information 505.

The first and second images may be RGB domain images, and the processor 102 may obtain the first luminance information 502 and the first color information by converting the first image into an Lab domain image and generate a second image by converting the Lab domain image based on the first color information and the second luminance information into an RGB domain image. The Lab domain may be domain including both luminance information and color information.

The processor 102 may generate a new Lab domain image based on the first color information and the second luminance information and convert the newly generated Lab domain image into an RGB domain image through color space converting or color space conversion. In this case, the RGB image may be presented by the second image and output on the display as a HDR image.

The dynamic range of the second image may be wider than the dynamic image of the first image. The second image (a HDR image) may have a higher contrast ratio and a wider dynamic range than the first image (an LDR image). Therefore, the second image converted from the first image may be a HDR image. The second image may have a higher contrast ratio or a wider dynamic range than the first image.

The second image have more levels of brightness than the first image, and therefore the subject may be clearly perceived.

Figure 6:
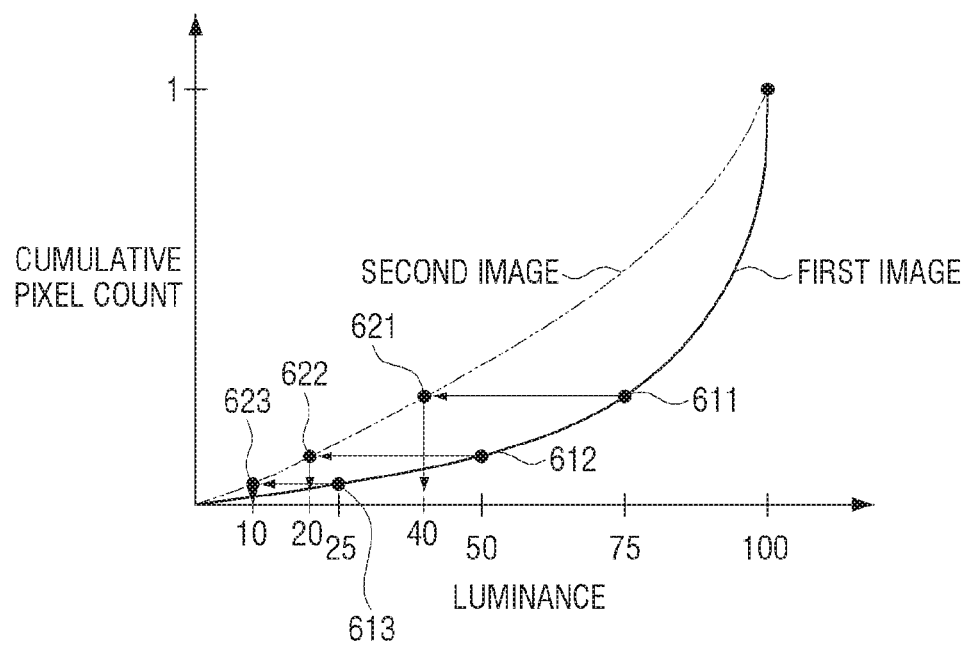
FIG. 6 is a view provided to explain a method for changing luminance information included in an LDR image, according to an embodiment.

FIG. 6 is a view provided to explain a method for changing luminance information included in an LDR image.

A difference between the first cumulative distribution function of the first image and the second cumulative distribution function of the second image may be a difference between luminance values. The cumulative distribution function of the HDR image may be obtained by using the first cumulative distribution function. The cumulative distribution function of the HDR image may correspond to the cumulative distribution function of the second image.

FIG. 6 illustrates both the first cumulative distribution function of the first image and the second cumulative distribution function of the second image. The electronic apparatus 100 may convert a luminance value of the first image to generate a second image having Lab domain. Although the cumulative distribution function of the second image is generated, a luminance value of the second image may not be set, and therefore the electronic apparatus 100 may use a histogram matching method for converting a luminance value of the first image.

For example, the electronic apparatus 100 may identify a point having the same cumulative pixel count as a point 611 corresponding to a luminance value of 75 in the first cumulative distribution function (the first image) in the second cumulative distribution function (the second image). In the second cumulative distribution function, a point having the same cumulative pixel count as the point 611 may be a point 621. The point 621 may be a luminance value of 40. The electronic apparatus 100 may convert a luminance value of pixels from 75 to 40 by using the above-described histogram matching method.

The electronic apparatus 100 may identify a point having the same cumulative pixel count as a point 612 having a luminance value of 50 in the first cumulative distribution function, in the second cumulative distribution function (the second image). In the second cumulative distribution function, a point having the same cumulative pixel count as the point 612 of the first image may be a point 622. The point 622 may have a luminance value of 20. The electronic apparatus 100 may convert a luminance value of pixels of the first image 50 to 20 by using the above-described histogram matching method.

The electronic apparatus 100 may identify a point having the same cumulative pixel count as a point 613 having a luminance value of 25 in the first cumulative distribution function, in the second cumulative distribution function (the second image). In the second cumulative distribution function, a point having the same cumulative pixel count as the point 613 of the first image may be a point 623. The electronic apparatus 100 may convert a luminance value of pixels of the first image from 25 to 10 by using the above-described histogram matching method.

FIG. 6 illustrates an example of converting luminance values with respect to the points having luminance values of 75, 50 and 25, but the disclosure is not limited thereto, but applied to all luminance values. Therefore, the electronic apparatus 100 may convert all luminance values from 0 to 100 by using histogram matching.

Figure 7:
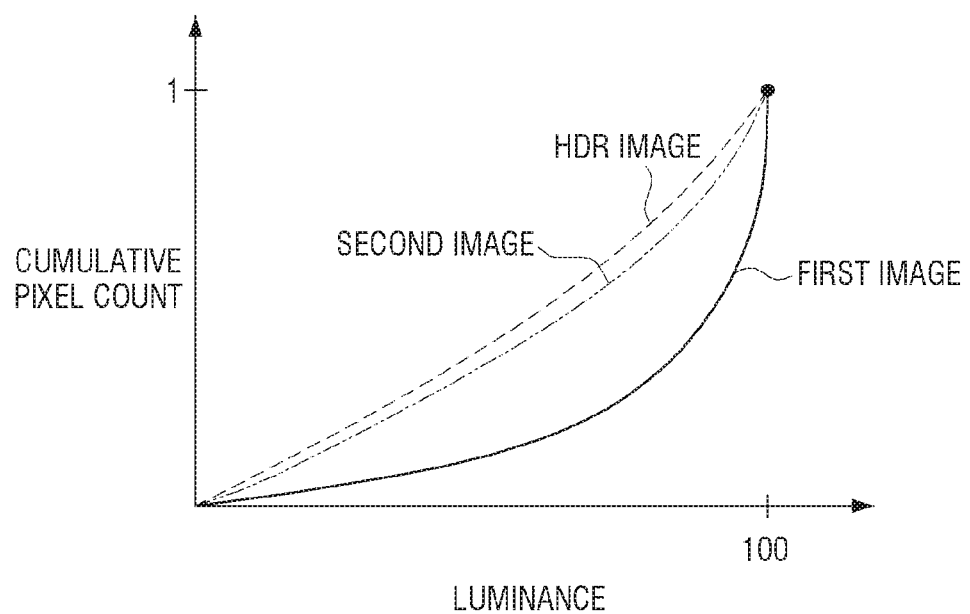
FIG. 7 is a view showing a cumulative distribution function for comparing a first image, a second image and a HDR image, according to an embodiment.

FIG. 7 is a view illustrating a cumulative distribution function for comparing a first image, a second image and a HDR image.

Referring to FIG. 7, a first image corresponding to an LDR image, a second image converted from the first image, and a HDR image generated by a conventional technique may be compared.

As described above, the first image may be an LDR image and the second image may be a HDR image. The HDR image may be image having a higher contrast ratio, and the HDR image shown in FIG. 7 may be an image generated by a conventional technique (a method of generating a HDR image by combining a plurality of pictures). For convenience of explanation, the HDR image shown in FIG. 7 will be exemplified as a HDR image of high quality.

Therefore, the HDR image shown in FIG. 7 may be a HDR image of high quality generated by a conventional technique.

The HDR image of high quality may not be easily generated. As described above, it may take times to photograph images with time differences for combining a plurality of pieces of images. However, it could be very difficult to photograph a plurality of pieces of images in the same quality since a subject could be shaken, or a photographer could move slightly.

Therefore, the present disclosure provides a method for generating a HDR image similar to a HDR image of high quality. The first image may relatively include many of the highest luminance values and the lowest luminance values since the first image corresponds to an LDR image, and thus a contrast ratio is lowest and luminance value is not divided into various levels. Thus, the cumulative distribution function of the first image may be biased to the right downward direction.

The higher the contrast ratio, the more uniform the luminance value, and a cumulative distribution function of a HDR image of high quality may be disposed less rightward than a cumulative distribution function of an LDR image.

The cumulative distribution function of the second image generated by the electronic apparatus 100 may be similar to a cumulative distribution function of the conventional HDR image of high quality.

The electronic apparatus 100 may generate a second cumulative distribution function of the second image by applying a conversion relation to the first cumulative distribution function of the first image, and the second cumulative distribution function generated by the electronic apparatus 100 may have a similar value to the cumulative distribution function of the HDR image of high quality.

Figure 8:
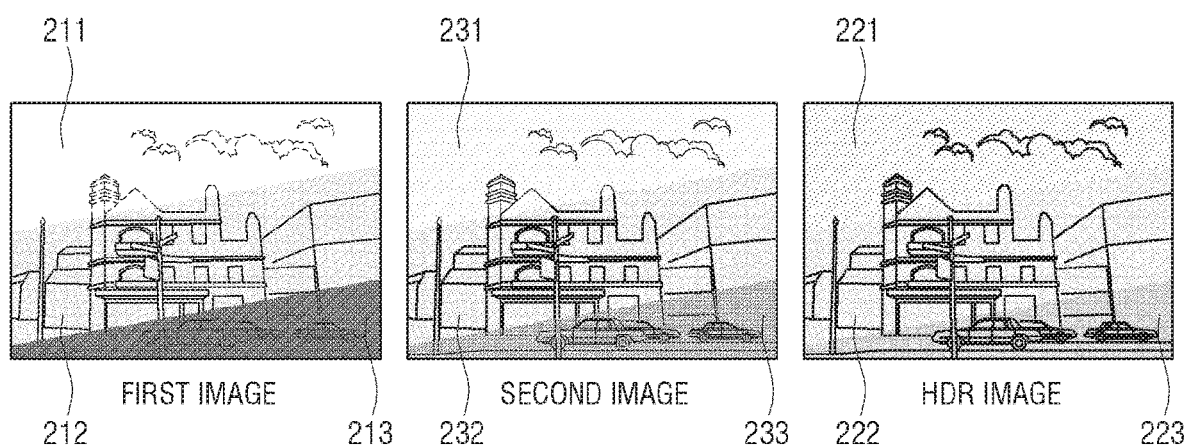
FIG. 8 is a view provided to compare a first image, a second image and a HDR image, according to an embodiment.

FIG. 8 is a view provided to compare a first image, a second image and a HDR image.

To avoid confusion between a second image and a HDR image shown in FIG. 8, a HDR image of high quality may be exemplified.

Referring to FIG. 2, the first image (an LDR image) may include a bright area 211, a general area 212 and a dark area 213. Since the first image (an LDR image) have a low contrast ratio, and therefore it is difficult to perceive a luminance level in a bright area or a dark area and the brightness of the subject may be reduced. In the general area 212, the subject may be easily perceived, but it could be difficult to perceive the subject in the bright area 211 or in the dark area 213.

However, it may be easier to perceive the subject in the HDR image of high quality rather than in the first image (an LDR image). For example, the HDR image of high quality may include a bright area 221, a general area 222, and a dark area 223. Compared to the first image (an LDR image), the subject may be easily perceived in the bright area 221 and the dark area 223. Since the HDR image has a high contrast ratio than the first image (an LDR image), and thus luminance may have various levels and the subject may be easily perceived.

The electronic apparatus 100 may generate a second image to have a similar value to the HDR image of high quality. The second image may have a bright area 231, a general area 232, and a dark area 233.

In the first image, which is an LDR image, the subject may not be clearly displayed in the bright area 211 and the dark area 213. However, in the HDR image of high quality, the subject may be comparatively clearly displayed in the bright area 221 and the dark area 223.

Since the electronic apparatus 100 generates the second image by converting the luminance value of the first image, the contrast ratio of the second image may be higher than the contrast ratio of the first image. The second image may comparatively clearly display the subject in the bright area 231 and the dark area 233.

In FIG. 8, luminance of the second image and the HDR image of high quality may be separately displayed, but the second image may be generated in a very similar manner as the HDR image of high quality.

Therefore, the electronic apparatus 100 may generate a second image by developing the first image and the second image may have a higher contrast ratio than the first image, and therefore, a subject may be clearly displayed in a bright area and in a dark area.

Figure 9:
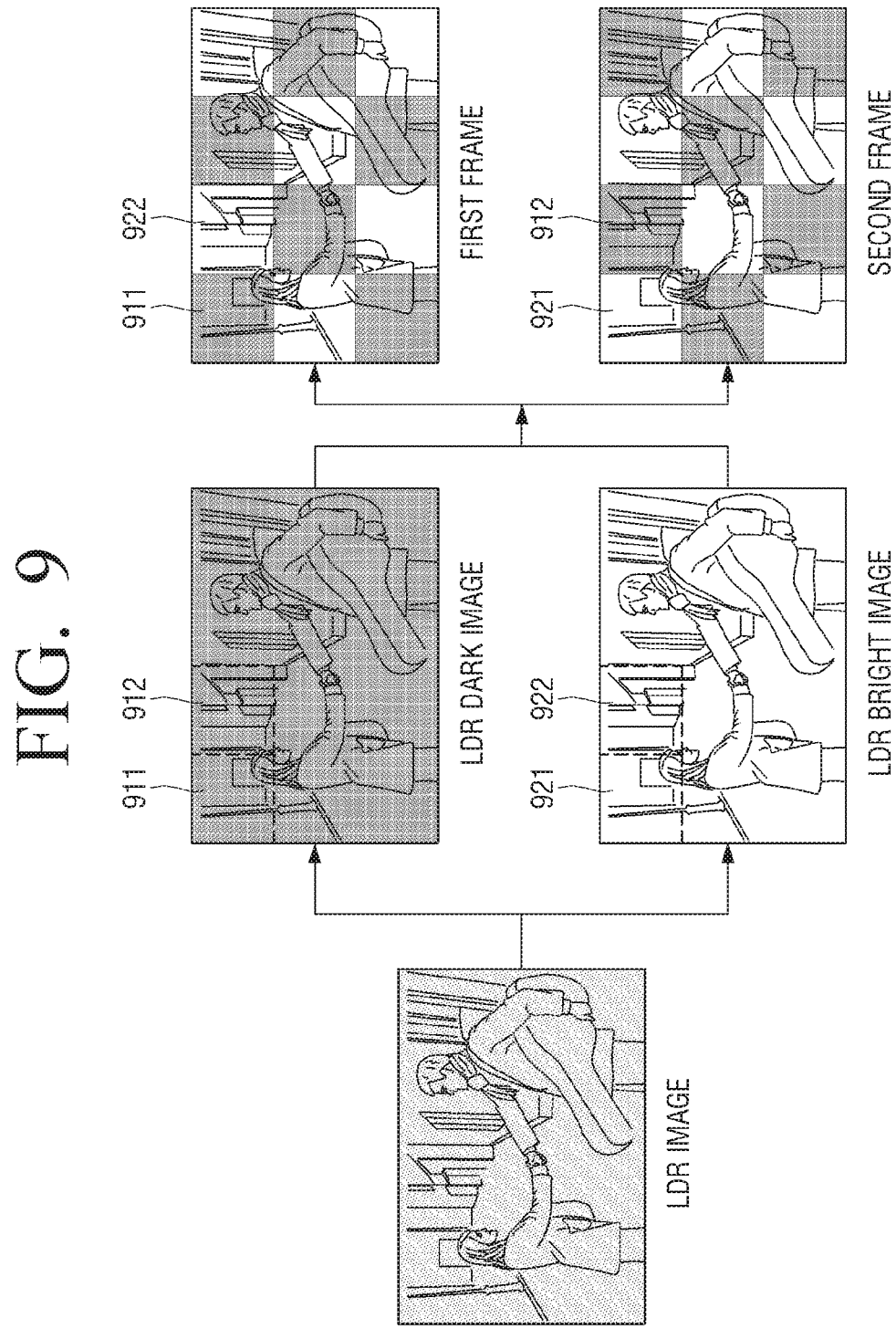
FIG. 9 is a view provided to explain an operation of an electronic apparatus, according to another embodiment.

FIG. 9 is a view provided to explain an operation of an electronic apparatus according to another embodiment.

Referring to FIG. 9, the electronic apparatus 100 may perform an operation similar to displaying a HDR image through scanning rate change.

The electronic apparatus 100 according to another embodiment may provide a method for converting an LDR image. Specifically, the electronic apparatus 100 may change all of the luminance values of the LDR image. The electronic apparatus 100 may generate an LDR image at a high luminance level and an LDR image at a low luminance level by adjusting luminance values of all the pixels.

The processor 102 may generate a frame of the same size as the first image and the second image. The frame may include the first image and the second image on a grid pattern. For example, the first area of the frame may include a part of the first image and the second area adjacent to the first area may include a part of the second image. In other words, a single frame may include both the part of the first image and the part of the second image, and when viewed from a distance, the frame may appear to be a single complete image.

After generating an LDR image at a high luminance level and an LDR image at a low luminance level, the electronic apparatus 100 may divide the LDR image at a high luminance level into a plurality of areas 911, 912 . . . , and the LDR image at a low luminance level into a plurality of areas of the same size 921, 922 . . . .

The electronic apparatus 100 may include a part of the LDR image at a high luminance level and a part of the LDR image at a low luminance level in a single frame. For example, assuming that a frame is in a format of 3×4, the frame may have arrangement values of (1,1),(1,2),(1,3),(1,4), (2,1),(2,2),(2,3),(2,4), (3,1),(3,2),(3,3) and (3,4).

The electronic apparatus 100 may generate a frame so that the areas of the LDR image at a high luminance level and the areas of the LDR image at a low luminance level may be arranged not to be adjacent to each other but to be positioned on a grid pattern.

For example, the electronic apparatus 100 may arrange the areas of the LDR image at a low luminance level in (1,1), (1,3), (2,2), (2,4), (3,1) and (3,3) of the frame, and the areas of the LDR image at a high luminance level in (1,2), (1,4), (2,1), (2,3), (3,2) and (3,4) of the frame. It is exemplified as a first frame in FIG. 9.

In addition, the electronic apparatus 100 may arrange the areas of LDR image at a high luminance level in (1,1), (1,3), (2,2), (2,4), (3,1) and (3,3) of the frame, and the areas of the LDR image at a low luminance level in (1,2), (1,4), (2,1), (2,3), (3,2) and (3,4) of the frame. It is exemplified as a second frame in FIG. 9.

However, although luminance values vary depending on partial areas, the shape and content of the whole image may be maintained to represent a complete image with the first image and the second image included in one frame.

For example, the LDR image at a low luminance level may include areas 911 and 912 and the LDR image at a high luminance level may include areas 921 and 922. The area 911 included in the LDR image at a low luminance level may be allocated to (1, 1), and the area 922 included in the LDR image at a high luminance level may be allocated to (1, 2) in the first frame.

The area 921 included in the LDR image at a high luminance level may be allocated to (1, 1), the area 912 included in the LDR image may be allocated to (1, 2) in the second frame.

In this case, the electronic apparatus 100 may alternately display the first frame and the second frame. The electronic apparatus 100 may set the first frame and the second frame to be alternately displayed in a short time.

When the electronic apparatus 100 displays the first frame and the second frame alternately in a short time, a user may view a dark image and a bright image alternately and perceive an image to a middle luminance level.

Therefore, without the need to photograph a plurality of images, only a single image may increase a contrast ratio.

Referring to FIG. 9, the electronic apparatus 100 may generate a grid pattern frame by using an LDR image at a high luminance level and an LDR image at a low luminance level. However, an LDR image and a HDR image may be used.

The electronic apparatus 100 may generate a new HDR image by changing a luminance value of an LDR image, and generate a grid pattern frame by combining a newly generated HDR image with an existing LDR image.

The electronic apparatus 100 may not directly display a newly added HDR image, but generate a grid pattern frame by using an existing LDR image and a newly generated HDR image.

For example, the electronic apparatus 100 may arrange LDR image areas in (1,1), (1,3), (2,2), (2,4), (3,1) and (3,3) in a frame, and HDR images areas in (1,2), (1,4), (2,1), (2,3), (3,2) and (3,4) in a frame, and this arrangement will be assumed as a third frame.

The electronic apparatus 100 may arrange HDR image areas in (1,1), (1,3), (2,2), (2,4), (3,1) and (3,3) in a frame, and LDR image areas in (1,2), (1,4), (2,1), (2,3), (3,2) and (3,4) in a frame, and this arrangement will be assumed as a fourth frame.

The electronic apparatus 100 may alternately display the third frame and the fourth frame. The electronic apparatus 100 may set the third frame and the fourth frame to be alternately displayed in a short time.

The reason why the electronic apparatus 100 does not directly display a HDR image, but formulate a frame on a grid pattern by using an LDR image and a HDR image is to maintain brightness of the original to the maximum level. Change from the LDR image to the HDR image may increase a contrast ratio so that levels of luminance may be clearly divided. However, unexpected errors may be caused while images are changed by a single conversion relation. Most of the images may be changed to HDR images, but an unexpected situation may occur to a user.

For this case, the electronic apparatus 100 may display an LDR image and a HDR image, which are original images, in a form of two grid patterns.

According to an embodiment, it is described that two types of frames may be provided for an image, but w three or more of frames may be provided by various combination. Further, the electronic apparatus 100 may display three of more of frames alternately.

Figure 10:
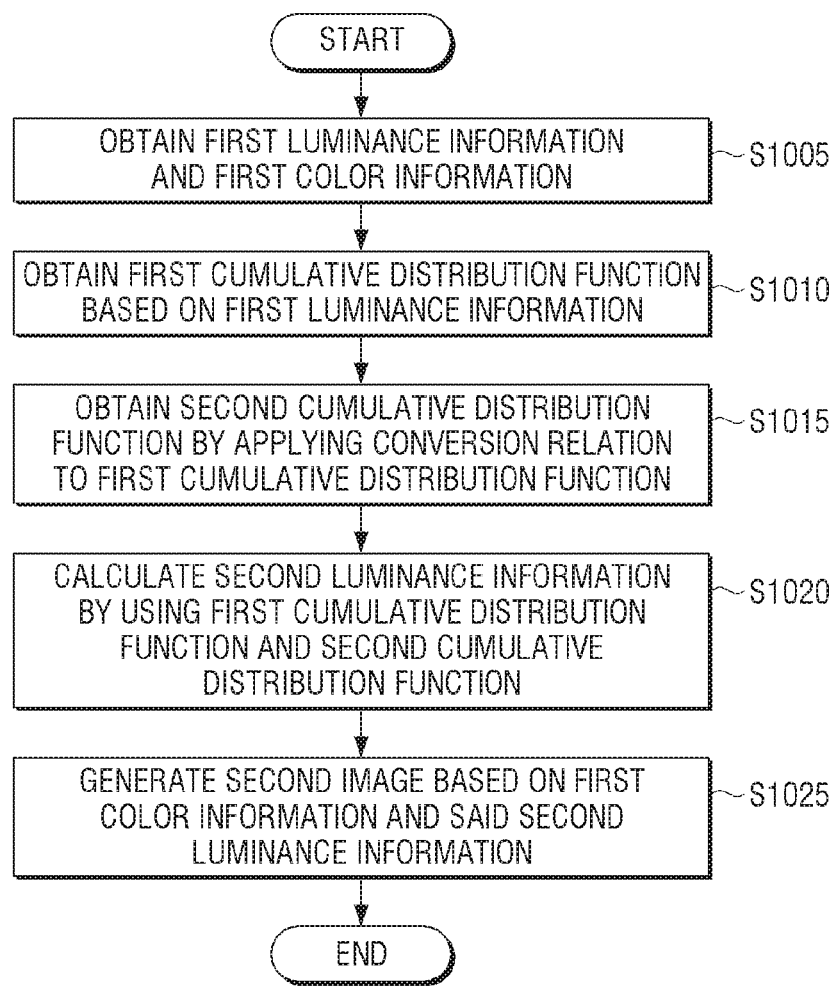
FIG. 10 is a flowchart provided to explain an electronic apparatus, according to an embodiment.

FIG. 10 is a flowchart provided to explain an electronic apparatus according to an embodiment.

Referring to FIG. 10, the electronic apparatus 100 may obtain first luminance information indicating luminance values of respective pixels included in a first image, and first color information indicating color values of the respective pixels at step S1005. The electronic apparatus 100 may obtain a first cumulative distribution function indicating a relation between a cumulative pixel count and each luminance level based on the first luminance information at step S1010. The electronic apparatus 100 may obtain a second cumulative distribution function by applying a predetermined conversion relation to the first cumulative distribution function at step S1015. The electronic apparatus 100 may calculate second luminance information indicating converted luminance values of respective pixels by using the first cumulative distribution function and the second cumulative distribution function at step S1020. The electronic apparatus 100 may generate a second image by using the first color information and the second luminance information at step S1025.

The dynamic range of the second image may be wider than the dynamic range of the first image. The first and second images may be RGB domain images.

The first cumulative distribution function may be obtained by accumulating the number of pixels having a luminance value equal to or smaller than a first luminance value and calculating a first cumulative pixel count corresponding to the first luminance value, and by accumulating the number of pixels having a luminance value equal to or smaller than a second luminance value greater than the first luminance value and calculating a second cumulative pixel count corresponding to the second luminance value.

The predetermined conversion relation may be obtained by training a process of converting an LDR training image to a HDR training image through deep-learning.

The calculating of the second luminance information at step S1020 may include obtaining converted luminance values corresponding to respective pixels based on luminance values of respective pixels by using histogram matching between the first and second cumulative distribution functions.

The calculating of the second luminance information at step S1020 may include identifying a cumulative pixel count corresponding to a specific luminance value in the first cumulative distribution function, identifying a luminance value corresponding to a cumulative pixel count same as the identified cumulative pixel count, and obtaining the identified luminance value as a converted luminance value having the specific luminance value.

The generating of the second image at step S1025 may include generating a second image by obtaining first luminance information and the first color information by converting the first image into an Lab domain image, and generating a second image, and by converting an Lab domain image based on the first color information and the second luminance information into an RGB domain image.

In addition, each of the first image and the second image may be identified by a plurality of pixel areas, a first frame may be generated by arranging the pixel area of the first image and the pixel area of the second image alternately, and a second frame may be generated by arranging the pixel area of the second image on the pixel area of the first image and arranging the pixel area of the first image on the pixel area of the second image.

In this case, the first frame and the second frame may be alternately displayed.

A method for controlling an electronic apparatus described in FIG. 10 may be embodied by an electronic apparatus as shown in FIG. 1, and of course may be embodied by other electronic apparatus with different configurations.

A controlling method for an electronic apparatus according to an embodiment may be embodied as a program and provided in an electronic apparatus. A program including a controlling method for an electronic apparatus may be stored and provided in a non-transitory computer readable medium.

A non-transitory computer readable medium that stores one or more instructions for performing an operation of the electronic apparatus 100 when a predetermined conversion relation is executed by the processor 102 of the electronic apparatus 100 may obtain first luminance information indicating luminance values of respective pixels included in a first image, and first color information indicating color values of the respective pixels, and obtain a first cumulative distribution function indicating a relation between a cumulative pixel count and each luminance level based on the first luminance information. A second cumulative distribution function may be obtained by applying the predetermined conversion relation to the first cumulative distribution function. The operation may include calculating second luminance information indicating converted luminance values of respective pixels by using the first cumulative distribution function and the second cumulative distribution function and generating a second image based on the first color information and the second luminance information.

The methods according to various embodiments of the present disclosure described above may be embodied in the form of an application that could be mounted on a conventional electronic apparatus.

The methods according to various embodiments of the present disclosure may be embodied by software upgrade, or hardware upgrade with respect to a conventional electronic apparatus.

It is also possible for various embodiments of the present disclosure described above to be performed through an embedded server provided in an electronic apparatus, or an external server of the electronic apparatus.

The controlling method for the electronic apparatus according to the above-described embodiment may be embodied as a program and provided to an electronic apparatus. In particular, a program including a controlling method for an electronic apparatus may be stored and provided in a non-transitory computer readable medium.

The various embodiments described above may also be embodied in a recording medium readable by a computer or a similar device using software, hardware, or a combination thereof. In accordance with a hardware implementation, the embodiments described in the present disclosure may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, embodiments described herein may be implemented by the processor 120 itself. In the implementation by hardware, embodiments such as the procedures and functions described herein may be implemented in separate software modules. Each of the software modules may perform one or more of the functions and operations described herein.

Meanwhile, computer instructions for performing processing operations in an electronic device according to various embodiments of the present disclosure described above may be stored in a non-transitory computer-readable medium. When the computer instructions stored in such non-temporary computer-readable medium are executed by a processor of a specific device, the specific device may perform a processing operation of an electronic apparatus according to above-described embodiments of the present disclosure.

The non-transitory computer readable medium means a medium that semi-permanently stores data and is readable by a device, not a medium that stores data for a short period of time such as a register, a cache, a memory, etc. Specific examples of non-transitory computer readable medium may include CD, DVD, hard disk, Blu-ray disk, USB, memory card, ROM, and the like.

Although embodiments have been shown and described, it will be appreciated by those skilled in the art that changes may be made to these embodiments without departing from the principles and spirit of the present disclosure. Accordingly, the scope of the invention is not construed as being limited to the described embodiments, but is defined by the appended claims as well as equivalents thereto.

What is claimed is:

1. An electronic apparatus, comprising:
a memory; and
a processor configured to:
control the memory to store a predetermined conversion relation,
obtain first luminance information indicating luminance values of respective pixels included in a first image, and obtain first color information indicating color values of the respective pixels;

obtain a first cumulative distribution function indicating a relation between a cumulative pixel count and each luminance level among a plurality of luminance levels based on the first luminance information;

obtain a second cumulative distribution function by applying the predetermined conversion relation to the first cumulative distribution function;

identify a cumulative pixel count corresponding to a first luminance value in the first cumulative distribution function;

identify a second luminance value corresponding to the identified cumulative pixel count in the second cumulative distribution function;

identify second luminance information indicating converted luminance values of the respective pixels by using the identified second luminance value; and generate a second image based on the first color information and the second luminance information.

2. The electronic apparatus as claimed in claim 1, wherein a dynamic range of the second image is wider than a dynamic range of the first image.

3. The electronic apparatus as claimed in claim 1, wherein the processor is further configured to obtain the converted luminance values corresponding to the respective pixels based on the luminance values of the respective pixels by using histogram matching between the first cumulative distribution function and the second cumulative distribution function.

4. The electronic apparatus as claimed in claim 1, wherein the first cumulative distribution function is obtained by accumulating a number of pixels having a luminance value less than or equal to the first luminance value and identifying a first cumulative pixel count corresponding to the first luminance value, and by accumulating a number of pixels having a luminance value less than or equal to the second luminance value greater than the first luminance value and identifying a second cumulative pixel count corresponding to the second luminance value.

5. The electronic apparatus as claimed in claim 1, wherein the predetermined conversion relation is a relation obtained by training a process of converting a Low Dynamic Range (LDR) training image into a High Dynamic Range (HDR) training image through deep-learning.

6. The electronic apparatus as claimed in claim 1, wherein the first and second images are RGB domain images, and
wherein the processor is further configured to generate the second image by obtaining the first luminance information and the first color information by converting the first image into a Lab domain image, and converting a Lab domain image based on the first color information and the second luminance information into an RGB domain image.

7. The electronic apparatus as claimed in claim 1, wherein the processor is further configured to:
identify each of the first image and the second image by a plurality of pixel areas,
generate a first frame by alternately arranging a pixel area of the first image and a pixel area of the second image, and
generate a second frame by arranging the pixel area of the second image on the pixel area of the first image and the pixel area of the first image on the pixel area of the second image, based on the first frame.

8. The electronic apparatus as claimed in claim 7, further comprising:
a display;
wherein the processor is further configured to control the display to alternately display the first frame and the second frame.

9. A controlling method for an electronic apparatus that stores a predetermined conversion relation, the method comprising:
obtaining first luminance information indicating luminance values of respective pixels included in a first image and, obtaining first color information indicating color values of the respective pixels;
obtaining a first cumulative distribution function indicating a relation between a cumulative pixel count and each luminance level among a plurality of luminance levels based on the first luminance information;
obtaining a second cumulative distribution function by applying the predetermined conversion relation to the first cumulative distribution function;
identifying a cumulative pixel count corresponding to a first luminance value in the first cumulative distribution function;
identifying a second luminance value corresponding to the identified cumulative pixel count in the second cumulative distribution function;
identifying second luminance information indicating converted luminance values of the respective pixels by using the identified second luminance value; and
generating a second image based on the first color information and the second luminance information.

10. The electronic apparatus as claimed in claim 9, wherein a dynamic range of the second image is wider than a dynamic range of the first image.

11. The method as claimed in claim 9, wherein the identifying of the second luminance information comprises obtaining the converted luminance values corresponding to the respective pixels based on the luminance values of the respective pixels by using histogram matching between the first cumulative distribution function and the second cumulative distribution function.

12. The method as claimed in claim 9, wherein the first cumulative distribution function is obtained by accumulating a number of pixels having a luminance value less than or equal to the first luminance value and identifying a first cumulative pixel count corresponding to the first luminance value, and by accumulating a number of pixels having a luminance value less than or equal to the second luminance value greater than the first luminance value and identifying a second cumulative pixel count corresponding to the second luminance value.

13. The method as claimed in claim 9, wherein the predetermined conversion relation is a relation obtained by training a process of converting a Low Dynamic Range (LDR) training image into a High Dynamic Range (HDR) training image through deep-learning.

14. The method as claimed in claim 9, wherein the first and second images are RGB domain images, and
wherein the generating of the second image comprises:
obtaining the first luminance information and the first color information by converting the first image into a Lab domain image; and
converting a Lab domain image based on the first color information and the second luminance information into an RGB domain image.

15. The method as claimed in claim 9, further comprising:
identifying each of the first image and the second image by a plurality of pixel areas; and
generating a first frame by alternately arranging a pixel area of the first image and a pixel area of the second image, and generating a second frame by arranging the pixel area of the second image on the pixel area of the first image and the pixel area of the first image on the pixel area of the second image, based on the first frame.

16. The method as claimed in claim 15, further comprising:
   displaying the first frame and the second frame alternately.

17. A non-transitory computer readable medium that stores one or more instructions that, when executed, cause an electronic apparatus to perform:
   obtaining first luminance information indicating luminance values of respective pixels included in a first image, and obtaining first color information indicating color values of the respective pixels;
   obtaining a first cumulative distribution function indicating a relation between a cumulative pixel count and each luminance level based on the first luminance information;
   obtaining a second cumulative distribution function by applying a predetermined conversion relation to the first cumulative distribution function;
   identifying a cumulative pixel count corresponding to a first luminance value in the first cumulative distribution function;
   identifying a second luminance value corresponding to the identified cumulative pixel count in the second cumulative distribution function;
   identifying second luminance information indicating converted luminance values of the respective pixels by using the identified second luminance value; and
   generating a second image based on the first color information and the second luminance information.

* * * * *